United States Patent
Wang et al.

(10) Patent No.: US 10,997,733 B2
(45) Date of Patent: May 4, 2021

(54) RIGID-BODY CONFIGURATION METHOD, APPARATUS, TERMINAL DEVICE, AND COMPUTER READABLE STORAGE MEDIUM

(71) Applicant: SHENZHEN REALIS MULTIMEDIA TECHNOLOGY CO., LTD, Shenzhen (CN)

(72) Inventors: Yue Wang, Shenzhen (CN); Qiuzi Xu, Shenzhen (CN)

(73) Assignee: SHENZHEN REALIS MULTIMEDIA TECHNOLOGY CO., LTD., Shenzhen (CN)

( * ) Notice: Subject to any disclaimer, the term of this patent is extended or adjusted under 35 U.S.C. 154(b) by 44 days.

(21) Appl. No.: 16/466,099

(22) PCT Filed: Nov. 15, 2017

(86) PCT No.: PCT/CN2017/111128
§ 371 (c)(1),
(2) Date: Jun. 3, 2019

(87) PCT Pub. No.: WO2019/095149
PCT Pub. Date: May 23, 2019

(65) Prior Publication Data
US 2020/0074645 A1 Mar. 5, 2020

(51) Int. Cl.
*G06T 7/73* (2017.01)
*G06T 7/246* (2017.01)

(52) U.S. Cl.
CPC .............. *G06T 7/248* (2017.01); *G06T 7/74* (2017.01); *G06T 2207/30204* (2013.01)

(58) Field of Classification Search
CPC .. G06T 7/248; G06T 7/74; G06T 2207/30204
See application file for complete search history.

(56) References Cited

U.S. PATENT DOCUMENTS

2013/0345718 A1* 12/2013 Crawford ............... A61B 5/066
606/130

FOREIGN PATENT DOCUMENTS

| CN | 101840508 A | 9/2010 |
|----|-------------|--------|
| CN | 101894377 A | 11/2010 |

(Continued)

OTHER PUBLICATIONS

World Intellectual Property Organization (WIPO) International Search Report for PCT/CN2017/111128 dated Aug. 14, 2018 6 Pages.

*Primary Examiner* — Chuong A Ngo
(74) *Attorney, Agent, or Firm* — Anova Law Group, PLLC

(57) ABSTRACT

Rigid body configuration method, apparatus, terminal device, and computer storage medium are provided. The method includes: initializing the positions of reflective markers of each rigid body; selecting a reflective marker from the reflective markers with undetermined target positions as a target reflective marker, fixing other reflective markers except for the target reflective marker, and successively moving the target reflective marker through each vacant position in the three-dimensional space of the rigid body to which the target reflective marker belongs; respectively calculating the degree of rigid-body difference when the target reflective marker is at each position based on the position information of each reflective marker; determining the position corresponding to the maximum value of the degree of rigid-body difference as the target position of the target reflective marker; using the same method to determine the target positions of all reflective markers in the system, and completing a rigid-body configuration.

14 Claims, 3 Drawing Sheets

(56) References Cited

FOREIGN PATENT DOCUMENTS

| | | |
|---|---|---|
| CN | 101957655 A | 1/2011 |
| CN | 102354400 A | 2/2012 |
| CN | 106600627 A | 4/2017 |

* cited by examiner

RIGID-BODY CONFIGURATION METHOD, APPARATUS, TERMINAL DEVICE, AND COMPUTER READABLE STORAGE MEDIUM

CROSS-REFERENCE TO RELATED APPLICATIONS

This application is a national phase entry under 35 U.S.C. §371 of International Application No. PCT/CN2017/111128, filed on Nov. 15, 2017, the entire content of which is incorporated herein by reference.

FIELD OF THE INVENTION

The present invention relates to the field of optical motion capture technology and, more particularly, relates to a rigid-body configuration method, apparatus, terminal device, and computer storage medium.

BACKGROUND

In current optical motion capture systems, the capture and tracking of a target object is typically achieved by capturing the motion trajectory of a reflective marker. Usually, a plurality of reflective markers is combined into a rigid body, and each rigid body corresponds to a certain target area on the target object. When tracking the target object, different target areas of the target object are mainly distinguished by identifying different rigid bodies on the target object. It can be seen that if the degree of similarities between multiple rigid bodies is high, the system may not be able to correctly distinguish these rigid bodies, which may result in incorrectly identifying the target areas, and failure in tracking the target object. Therefore, when performing the configuration for rigid bodies, it should be ensured that the degree of differences between different rigid bodies is large.

The rigid-body configuration methods currently adopted are mainly as follows: randomly arranging the initial position of each reflective marker of each rigid body; traversing all possible positions of each reflective marker to calculate the sum of the degree of differences between any two rigid bodies, and taking the rigid-body configuration corresponding to the maximum value among the plurality of sums as the final rigid-body configuration scheme. However, using the method described above requires traversing all positions that each reflective marker may take for calculation, and thus the calculation amount is large.

Technical Problems

In view of this, the embodiments of the present invention provide a rigid-body configuration method, apparatus, terminal device, and computer storage medium, and are intended to solve the problems of large calculation amount in the rigid-body configuration process.

BRIEF SUMMARY OF THE INVENTION

A first aspect of the embodiments of the present invention provides a rigid-body configuration method, including:
initializing the positions of all reflective markers on each rigid body of more than two rigid bodies, each rigid body containing more than two reflective markers; and
determining the target positions of the all reflective markers on each of the more than two rigid bodies, and obtaining the current rigid-body configuration result,
where the target position of any reflective marker on each rigid body is determined by following steps:
selecting any reflective marker from the reflective markers with undetermined target positions as a target reflective marker,
fixing other reflective markers except for the target reflective marker, and successively moving the target reflective marker through each vacant position of the rigid body of the target reflective marker,
respectively calculating the degree of rigid-body difference when the target reflective marker is at each vacant position based on the position information of each reflective marker, where the degree of rigid-body difference is a sum of the degree of differences between any two rigid bodies of the more than two rigid bodies, and
determining the vacant position that corresponds to the maximum value of the degree of rigid-body difference as the target position of the target reflective marker.

A second aspect of the embodiments of the present invention provides a rigid-body configuration apparatus, including:
a position initializing module, configured to initialize the positions of all reflective markers on each rigid body of more than two rigid bodies, each rigid body including more than two reflective markers; and
a target position determining module, configured to determine the target positions of the all reflective markers on each of the more than two rigid bodies, and to obtain the current rigid-body configuration result,
where the target position determining module includes:
a reflective marker selection unit, configured to select any reflective marker from the reflective markers with undetermined target positions as a target reflective marker,
a reflective marker placing unit, configured to fix other reflective markers except for the target reflective marker, and successively move the target reflective marker through each vacant position of the rigid body of the target reflective marker,
a rigid-body difference calculating unit, configured to respectively calculate, based on the position information of each reflective marker, the degree of rigid-body difference when the target reflective marker is at each vacant position, where the degree of rigid-body difference is a sum of the degree of differences between any two rigid bodies of the more than two rigid bodies, and
a target position determining unit, configured to determine the vacant position that corresponds to the maximum value of the degree of rigid-body difference as the target position of the target reflective marker.

A third aspect of the embodiments of the present invention provides a terminal device including a memory, a processor, and a computer program stored in the memory and operable on the processor. When the processor executes the computer program, the steps of the rigid-body configuration method as provided by the first aspect of the embodiments of the present invention are implemented.

A fourth aspect of the embodiments of the present invention provides a computer readable storage medium. The computer readable storage medium stores a computer program. When the computer program is executed by a processor, the steps of the rigid-body configuration method as provided by the first aspect of the embodiments of the present invention are implemented.

Beneficial Effect

In the embodiments of the present invention, the positions of the reflective markers of each rigid body are initialized;

a reflective marker is selected as the target reflective marker from the reflective markers with undetermined target positions, and under a condition that the other reflective markers except for the target reflective maker are fixed, the target reflective marker is successively moved through each vacant position of the rigid body of the target reflective marker; based on the position information of each reflective marker, the degree of rigid-body difference when the target reflective marker is at each position is respectively calculated, and the degree of rigid-body difference is a sum of the degree of differences between any two rigid bodies of the more than two rigid bodies; the position that corresponds to the maximum value of the degree of rigid-body difference is determined as the target position of the target reflective marker; and the same method is adopted to determine the target positions of all reflective markers in the system, and thus complete a rigid-body configuration. Assuming that a system includes 3 rigid bodies, each rigid body includes 4 reflective markers, and the number of positions in each rigid body is 30, and when the method, according to the existing technology, of traversing all possible positions of each reflective marker to calculate the sum of the degree of differences between any two rigid bodies is adopted, the sum of the degree of differences needs to be calculated for a total of $C^3(30, 4)$ times; when the method of the present application is adopted, the number of vacant positions that each reflective marker can be placed at is 27, that is, the sum of the degree of differences needs to be calculated 27 times. Therefore, the system only needs to calculate the sum of the degree of differences 12×27=324 times in total. It can be seen that the present application can greatly reduce the amount of calculation relative to the existing technology, thereby reducing the processing time of the system.

DETAILED DESCRIPTION

In the following description, for purposes of illustration instead of restriction, specific details such as specific system architectures, techniques, etc. are presented to facilitate a thorough understanding of the embodiments of the present invention. However, it will be apparent to those skilled in the art that the present invention may be implemented in other embodiments without these specific details. In other instances, detailed descriptions of well-known systems, devices, circuits, and methods are omitted so as not to obscure the description of the present invention.

The embodiments of the invention provide a rigid-body configuration method, apparatus, terminal device, and computer storage medium, which aim to solve the problem of large calculation amount in the rigid body configuration process.

Figure 1A:
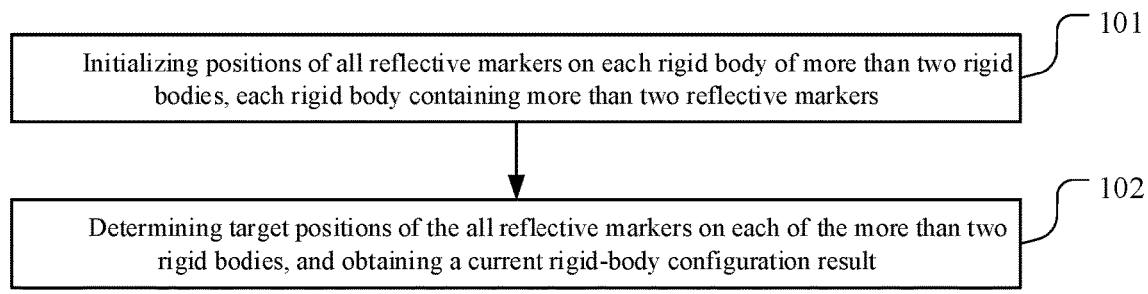
FIG. 1A illustrates a flowchart of a first example of a rigid-body configuration method according to various embodiments of the present invention.

Referring to FIG. 1A, a first example of a rigid-body configuration method according to the embodiments of the present invention includes the following steps.

In 101, the positions of all reflective markers on each rigid body of more than two rigid bodies may be initialized. Each rigid body may contain more than two reflective markers.

Rigid body here refers to an object that, when moving and after being subjected to force, the shape and size are unchanged and the relative positions of the internal points are unchanged, and is an ideal model. A reflective marker refers to a marker having a surface covered by a special reflective material and a common shape such as a spherical shape, a hemispherical shape, etc., and often used for capturing moving objects. In step 101, the system may include more than two rigid bodies, and each rigid body may include more than two reflective markers. The number of reflective markers for each rigid body may be the same or different. When the system includes 3 rigid bodies and each rigid body contains 4 reflective markers, the system contains a total of 3×4=12 reflective markers. Each reflective marker can be placed at any one position in the three-dimensional space of the rigid body to which it belongs, and the three-dimensional space of each rigid body can have any shape. Moreover, the shape of the three-dimensional space and the number of positions included (needs to be larger than the number of reflective markers contained in the rigid body) may be different for different rigid bodies in the system. Prior to performing the position initialization, the three-dimensional space of each rigid body in the system should be pre-set. When performing the position initialization, a random initialization method may be adopted, that is, the initial position of each reflective marker may be randomly set in the rigid body to which it belongs. Other initialization method may also be adopted. For example, the initial position of each reflective marker in the rigid body to which it belongs may be set according to a known initial position table, or the initial position of each reflective marker in the rigid body to which it belongs may be calculated and generated using other functions that are not random.

In 102, the target positions of the all reflective markers on each of the more than two rigid bodies may be determined, and a current rigid-body configuration result may be obtained.

After the initialization of the positions of the reflective markers is completed, the target positions of the all reflective markers on each of the more than two rigid bodies may be determined to obtain the current rigid-body configuration result. The target position may refer to the optimal position of the reflective marker in the rigid body to which it belongs. Setting each reflective marker to the corresponding target position can ensure a large degree of differences between different rigid bodies in the system, thereby avoiding the problem of object tracking failure when performing optical motion capture.

When determining the target positions of the all reflective markers on each of the more than two rigid bodies, the specific operation method may include: selecting any reflective marker in the system and determining the target position of the reflective marker; selecting a next reflective marker and determining the target position of the next reflective marker; repeat the above process until the target positions of the all reflective markers in the system are determined.

Figure 1B:
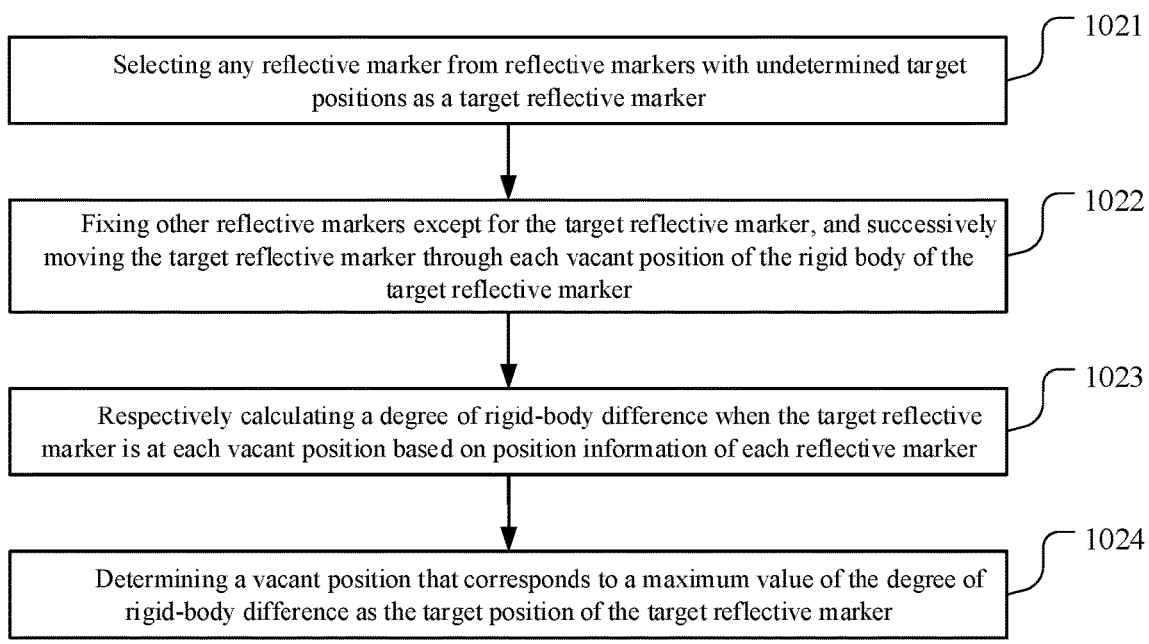
FIG. 1B illustrates a flowchart of a method for determining a target position of any reflective marker on each rigid body according to the embodiment shown in FIG. 1.

As shown in FIG. 1b, the target position of any reflective marker on each rigid body is determined by the following steps 1021 to 1024.

In 1021, any reflective marker from the reflective markers with undetermined target positions may be selected as a target reflective marker.

When determining the target positions of the reflective markers, the reflective markers in the system can be divided into two types, that is, reflective markers with determined target positions and reflective markers with undetermined target positions. Therefore, when determining the target position for any reflective marker on the rigid body, first, it is necessary to select any reflective marker from the reflective markers with undetermined target positions as the target reflective marker. The target reflective marker may be a currently-selected reflective marker whose target position needs to be determined. The target reflection marker may be randomly selected, or may be specifically selected according to a preset order. After the target position of the selected reflective marker is determined, a next reflective marker may be selected as a target reflective marker, and so on.

In 1022, other reflective markers except for the target reflective marker may be fixed, and the target reflective marker may be successively moved through each vacant position of the rigid body of the target reflective marker.

After determining the target reflective marker, it is necessary to fix the positions of the other reflective markers except for the target reflective marker. It can be understood that among the other reflective markers except for the target reflective marker, two types of reflective markers are included, that is, the reflective markers whose target positions are determined and the reflective markers whose target positions are undetermined. Therefore, when fixing the position of the other reflective markers except for the target reflective marker, the specific operation method may include: fixing the reflective markers with determined target positions respectively to the target positions, and fixing the reflective markers with undetermined target positions respectively to the initial positions.

When successively moving the target reflective marker through each vacant position of the rigid body of the target reflective marker, the vacant position may refer to a position in the rigid body that does not have any reflective marker placed on, and the target reflective marker can be moved to every vacant position in the rigid body. Moving from the current position to a next position may be regarded as one movement. The specific path of the movement may not be limited (that is, which position the movement starts from, and which position to move from and which position to move to for each movement may not be limited), as long as it is ensured that the movement traversals each vacant position in the three-dimensional space once, and other reflective markers except for the target reflective marker (including the reflective markers of other rigid bodies) are fixed during each movement.

In 1023, based on the position information of each reflective marker, the degree of rigid-body difference when the target reflective marker is at each vacant position may be respectively calculated.

A three-dimensional coordinate system may be established in the three-dimensional space of each rigid body, such that the position information corresponding to each reflective marker in each rigid body can be obtained. The degree of rigid-body difference when the target reflective marker is at each vacant position may be respectively calculated based on the position information of each reflective marker in the system. During the movement of the target reflective marker, the degree of rigid-body difference of the position may be calculated every time the position is moved, or only the position information may be recorded when moving to a position, and after the end of the movement, the position information of each position may be read out to respectively calculate the degree of rigid-body difference. The degree of rigid-body difference may be a sum of the degree of differences between any two rigid bodies of the more than two rigid bodies, and the degree of differences between any two rigid bodies can be calculated by using an objective function method according to the existing technology. When calculating the degree of rigid-body difference, for a reflective marker with a determined target position, the position information of the reflective marker may specifically be the position information of the target position; and for a reflective marker with an undetermined target position, the position information of the reflective marker may specifically be the position information of the initial position.

For example, a system is assumed to include 3 rigid bodies: rigid body 'A', rigid body 13', and rigid body 'C', each rigid body contains 4 reflective markers, the currently-selected target reflective marker is a reflective marker 'a' of the rigid body 'A', and 'a' is currently moved to a position 'X' in the three-dimensional space of the rigid body 'A'. Therefore, the degree of rigid-body difference when 'a' is located at the position 'X' may be calculated by the following steps: based on the position information of each reflective marker in the system (the reflective marker 'a' is at the position 'X', and the other reflective markers are respectively located at the initial positions or the target positions) and combined with the objective function method, the degree of differences between the rigid body 'A' and the rigid body 'B' (denoted as difference 'AB'), the degree of differences between the rigid body 'A' and the rigid body 'C' (denoted as difference 'AC'), and the degree of differences between the rigid body 'B' and the rigid body 'C' (denoted as difference 'BC') may be calculated. The above three degrees of differences may be added together to obtain the degree of rigid-body difference, i.e. difference 'AB'+difference 'AC'+difference 'BC', when 'a' is placed at the position 'X'. The same method may be used to obtain the degree of rigid-body difference when 'a' is placed at other vacant position of the rigid body 'A', and the correspondence between the position and the degree of rigid-body difference may be recorded.

In 1024, the vacant position that corresponds to the maximum value of the degree of rigid-body difference may be determined as the target position of the target reflective marker.

After calculating the degree of rigid-body difference when the target reflective marker is at each vacant position, the vacant position corresponding to the maximum value of the degree of rigid-body difference may be determined as the target position of the target reflective marker. That is, when the target reflective marker is at the target position, the degree of rigid-body difference of the system may be the largest.

As such, the determination of the target position of a reflective marker is completed. After the target position of one of the reflective markers is determined, steps 1021 to 1024 may be performed again to determine the target position for a next reflective marker with a target position undetermined. For instance, in the above example, after the target position of the reflective marker 'a' is determined, a reflective marker 'b' whose target position is undetermined may be taken as a current target reflective marker, and by performing steps 1021 to 1024, the target position of the reflective marker 'b' may be determined. After the target positions of the all reflective markers in the system are determined, the operation of step 102 may thus be completed, and a rigid-body configuration result may be obtained.

In the embodiment of the present invention, the positions of the reflective markers of each rigid body are initialized; a reflective marker is selected from the reflective markers with undetermined target positions as the target reflective marker, and with other reflective markers except for the target reflective marker fixed, the target reflective marker is successively moved through each of the vacant positions in the three-dimensional space of the rigid body; and based on the position information of each reflective marker, the degree of rigid-body difference is respectively calculated when the target reflective marker is at each position, and the degree of rigid-body difference is a sum of the degree of differences between any two rigid bodies of the more than two rigid bodies; the position corresponding to the maximum value of the degree of rigid-body difference is determined as a target position of the target reflective marker; the same method is adopted to determine the target positions of all reflective markers in the system, and thus complete a rigid-body configuration. Assuming that a system includes 3 rigid bodies, each rigid body includes 4 reflective markers, and the number of positions in each rigid body is 30, and when the method, according to the existing technology, of traversing all possible positions of each reflective marker to calculate the sum of the degree of differences between any two rigid bodies is adopted, the sum of the degree of differences needs to be calculated for a total of $C^3(30, 4)$ times; when the method of the present application is adopted, the number of vacant positions that each reflective marker can be placed at is 27, that is, the sum of the degree of differences needs to be calculated 27 times. Therefore, the system only needs to calculate the sum of the differences 12*27=324 times in total. It can be seen that the present application can greatly reduce the amount of calculation relative to the existing technology, thereby reducing the processing time of the system.

It should be noted that, for calculating the degree of differences between two rigid bodies based on the position information of each reflective marker and combined with the objective function method, the calculation amount is very large. Therefore, before calculating the degree of differences, some positions that are obviously undesirable (e.g., causing the degree of differences between the two rigid bodies becoming too small) may be filtered out, and the calculation of the degree of differences for these positions may be dropped off to further reduce the calculation amount.

Further, in order to further reduce the amount of calculation, before respectively calculating the degree of rigid-body difference when the target reflective marker is at each vacant position based on the position information of each reflective marker, the method may further include:

determining the invalid positions of the target reflective marker on the rigid body based on the position information of each reflective marker. The invalid positions here may be the positions that may cause confusion between any two rigid bodies of the system, or may adversely affect subsequent motion capture.

Specifically, the invalid positions may be determined by the following three methods.

Method 1: Based on the position information of each reflective marker on the rigid body to which the target reflective marker belongs, whether all reflective markers of the rigid body are in a same plane may be determined; and when all reflective markers of the rigid body are in a same plane, the position at which the target reflective marker is currently located may be determined as an invalid position.

It has been found through research that when all reflective markers of a rigid body are in a same plane, the rigid body may be easily confused with other rigid bodies, causing misidentification. Therefore, in the rigid body of the target reflective marker, the position causing all reflective markers of the rigid body to be in a same plane may be determined as an invalid position. In a specific operation, the invalid position may be determined one by one during the movement of the target reflective marker. For example, each time after the target reflective marker is moved, whether all reflective markers on the rigid body are in a same plane may be determined; if yes, the position at which the target reflective marker is currently located may be determined as an invalid position. Then, the target reflective marker may be moved to a next position, and the above judgment process may be repeated until all invalid positions on the rigid body are found.

Method 2: Based on the position information of each reflective marker on the rigid body to which the target reflective marker belongs, the distances between every two reflective markers of the rigid body may be respectively calculated; when among the distances, there is a distance smaller than a first threshold, the position at which the target reflective marker is currently located may be determined as an invalid position.

It has been found through research that when the distance between any two reflective markers in a rigid body is too small, it will have adverse effects on subsequent motion capture. Therefore, a minimum distance (i.e., a first threshold) between two reflective markers on a same rigid body may be set. When the distance between any two reflective markers in the rigid body is less than the minimum distance, the position at which the target reflective marker is currently located may be determined as an invalid position. In a specific operation, the invalid position may also be determined one by one during the movement of the target reflective marker. For example, each time after the target reflective marker is moved, the distances between every two reflective markers on the rigid body may be calculated; when a certain distance among the distances is less than the minimum distance, the position at which the target reflective marker is currently located may be determined as an invalid position. Then, the target reflective marker may be moved to a next position, and the above judgment process may be repeated until all invalid positions on the rigid body are found.

Method 3: Based on the position information of each reflective marker, the degrees of similarities between any two rigid bodies of the more than two rigid bodies may be calculated; when among the degrees of similarities, there is a degree of similarities that meets a preset condition, the position at which the target reflection marker is currently located may be determined as an invalid position.

During rigid-body configuration, not only should the degree of differences between all rigid bodies be maximized (i.e., the sum of the degree of differences between any two rigid bodies in the system should be the largest), but also the degree of similarities between any two rigid bodies in the system should be within a reasonable range to avoid misidentification between rigid bodies. Therefore, when among the degrees of similarities, there is a degree of similarities that meets the preset condition (e.g., the degree of similarities is greater than a certain threshold), the position at which the target reflective marker is currently located may be determined as an invalid position. In a specific operation, the invalid position may also be determined one by one during the movement of the target reflective marker. For example, each time after the target reflective marker is moved, the degrees of similarities between any two rigid bodies in the system may be calculated; when among the degrees of similarities, a certain degree of similarities obtained by calculation meets the preset condition, the position at which the target reflective marker is currently located may be determined as an invalid position. Then, the target reflective marker may be moved to a next position, and the above judgment process may be repeated until all invalid positions on the rigid body are found.

Further, assuming that a first rigid body and a second rigid body are any two rigid bodies in the system that have a same number of reflective markers, whether the degree of similarities between the first rigid body and the second rigid body meets the preset condition may then be determined through the following steps.

(1) Based on the position information of the reflective markers on the first rigid body, the distances between every two reflective markers in the first rigid body may be respectively calculated to obtain a first distance set.

(2) The plurality of distance values in the first distance set may be numbered in a first order, and the first order may be an order in which the distance values are from large to small, or an order in which the distance values are from small to large.

(3) Based on the position information of the reflective markers on the second rigid body, the distances between every two reflective markers in the second rigid body may be respectively calculated to obtain a second distance set.

(4) The plurality of distance values in the second distance set may be numbered in the first order.

(5) Distance subtractions may be respectively performed between distance values that are numbered the same in the first distance set and the second distance set to obtain a plurality of distance differences.

(6) When the number of the distance differences, among the plurality of distance differences, falling within a preset range interval is greater than a second threshold, the degree of similarities between the first rigid body and the second rigid body may then be determined as meeting the preset condition.

Regarding the above steps (1) to (6), the following provides an example for illustration. Assuming that both the first rigid body and the second rigid body have four reflective markers, the first distance set can be represented by {A1, A2, A3, A4, A5, A6}, with A1 to A6 the distance values between every two reflective markers in the first rigid body, and A1>A2>A3>A4>A5>A6; and the second distance set can be represented by {B1, B2, B3, B4, B5, B6}, with B1 to B6 the distance values between every two reflective markers in the second rigid body, and B1>B2>B3>B4>B5>B6. A1 to A6 and B1 to B6 are both numbered according to a first order, e.g. numbered from small to large. That is, A1 and B1 are number 1, A2 and B2 are number 2, and so on. Distance subtractions are respectively performed between the distance values that are numbered the same in the first distance set and the second distance set to obtain a plurality of distance differences. That is, a total of 6 distance differences: A1-B1, A2-B2, . . . , are obtained. The values of the preset range interval and the second threshold may be determined based on experience, and when the number of the distance differences, among the plurality of distance differences, falling within the preset range interval is greater than the second threshold, the degree of similarities between the first rigid body and the second rigid body is determined to meet the preset condition; otherwise the degree of similarities between the first rigid body and the second rigid body is determined to not meet the preset condition.

It should be particularly noted that, in practical applications, any one of the above three methods may be used alone, or a combination of more than two may be used.

After determining the invalid positions, the respectively calculating the degree of rigid-body difference when the target reflective marker is at each vacant position based on the position information of each reflective marker may specifically be: respectively calculating the degree of rigid-body difference when the target reflective marker is at each vacant position other than the invalid positions based on the position information of each reflective marker.

Obviously, eliminating the invalid positions before calculating the degree of rigid-body difference may not only further reduce the calculation amount, but also ensure that the degree of differences between any two rigid bodies in the system meets the requirements, which greatly reduces the risk of misidentification of rigid bodies.

Figure 2:
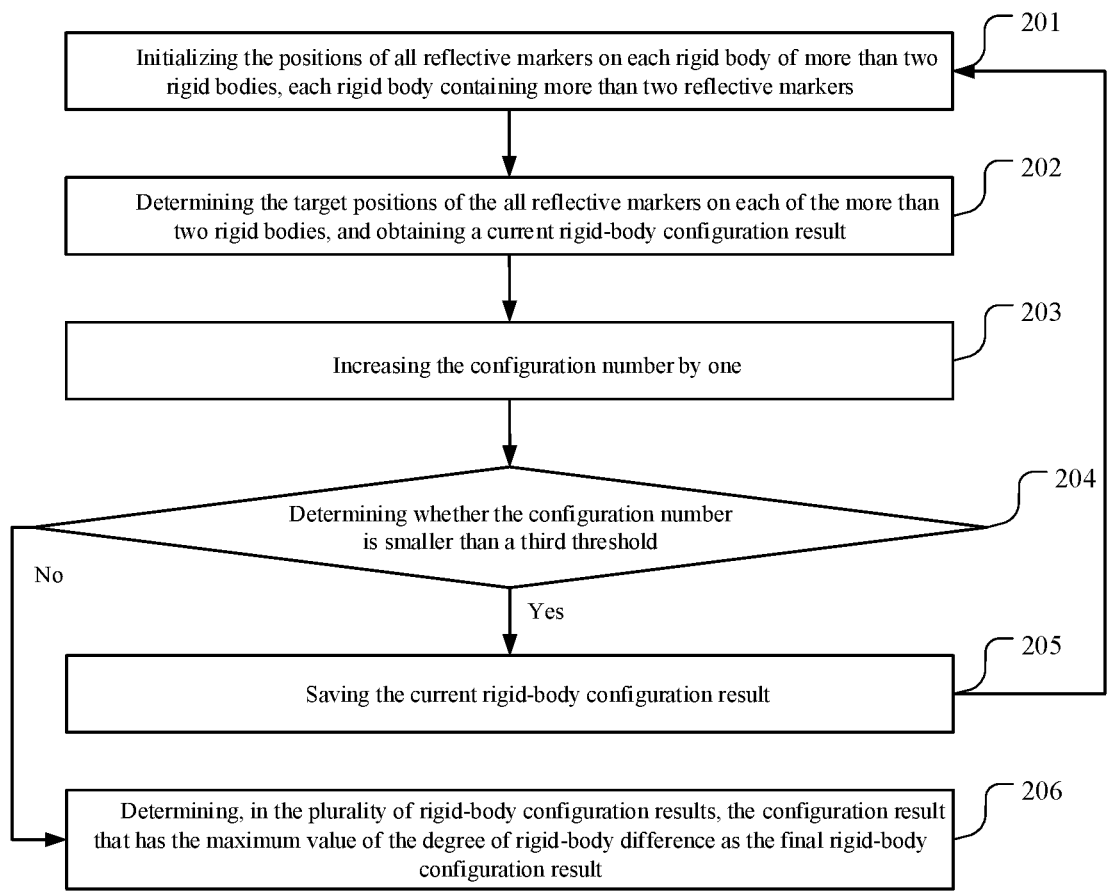
FIG. 2 illustrates a flowchart of a second example of a rigid-body configuration method according to various embodiments of the present invention.

Referring to FIG. 2, a second example of a rigid-body configuration method according to the embodiments of the present invention includes the following steps.

In 201, the positions of the all reflective markers on each rigid body of more than two rigid bodies may be initialized. Each rigid body may contain more than two reflective markers.

In 202, the target positions of the all reflective markers on each of the more than two rigid bodies may be determined, and a current rigid-body configuration result may be obtained.

Steps 201 to 202 are the same as steps 101 to 102. For details, reference can be made to the related description of steps 101 to 102.

In 203, the configuration number may be increased by one.

Steps 201 to 202 are a rigid-body configuration process of the system. The initial value of the number of rigid-body configurations may be 0. When a rigid-body configuration is completed, the number of rigid-body configurations may accumulate one, that is, the specific value of the configuration number may be increased by 1.

In 204, whether the configuration number is smaller than a third threshold may be determined.

When the number of the configurations is less than the third threshold, the step 205 may be performed; and when the number of the configurations is greater than or equal to the third threshold, step 206 may be performed. The third threshold can be reasonably determined according to actual needs, e.g., can be set to 50, which indicates that a total number of 50 rigid-body configurations are performed.

In 205, the current rigid-body configuration result may be saved.

The number of rigid-body configurations has not yet reached the set value, so the current rigid-body configuration result may be saved, and then step 201 may be performed again. The position of each reflective marker may be randomly initialized to start the next rigid-body configuration.

In 206, in the plurality of rigid-body configuration results, the configuration result that has the maximum value of the degree of rigid-body difference may be determined as the final rigid-body configuration result.

The rigid-body configuration has reached the set value, and the configuration result in the plurality of rigid-body configuration results that has the maximum value of the degree of rigid-body difference may be determined as the final rigid-body configuration result, thereby completing the rigid-body configuration process of the entire system. Obviously, through the scheme of performing multiple rigid-body configurations and selecting the optimal configuration result from the plurality of configuration results as the final rigid-body configuration, more desired rigid-body configuration effect can be obtained.

In the embodiment of the present invention, the positions of the all reflective markers on each of the two rigid bodies are initialized, and each rigid body includes more than two reflective markers; the target positions of the all reflective markers on each of the more than two rigid bodies are determined to obtain the current rigid-body configuration result; the configuration number is increased by one; whether the configuration number is less than a third threshold is determined; when the configuration number is less than the third threshold, the rigid-body configuration result is saved, and then the step of initializing all reflective markers on each rigid body of the more than two rigid bodies is performed again to start a next rigid-body configuration; when the number of the configurations is greater than or equal to the third threshold, the configuration result in the plurality of rigid-body configuration results that has the maximum value of the degree of rigid-body difference is determined as the final rigid-body configuration result. Compared with the first embodiment of the present invention, the present embodiment performs multiple rigid-body configurations to obtain a plurality of rigid-body configuration results, and then selects the configuration result with the maximum value of the degree of rigid-body difference as the final rigid-body configuration result, such that a more complete rigid-body configuration scheme is obtained.

It should be understood that the size of the serial number of each step in the above embodiments does not mean the order of execution, and the order of execution of each process should be determined by its function and internal logic, and should not constitute any limitation on the implementation process of the embodiment of the present invention.

The above mainly describes a rigid-body configuration method, and in the following, a rigid-body configuration apparatus will be described.

Figure 3:
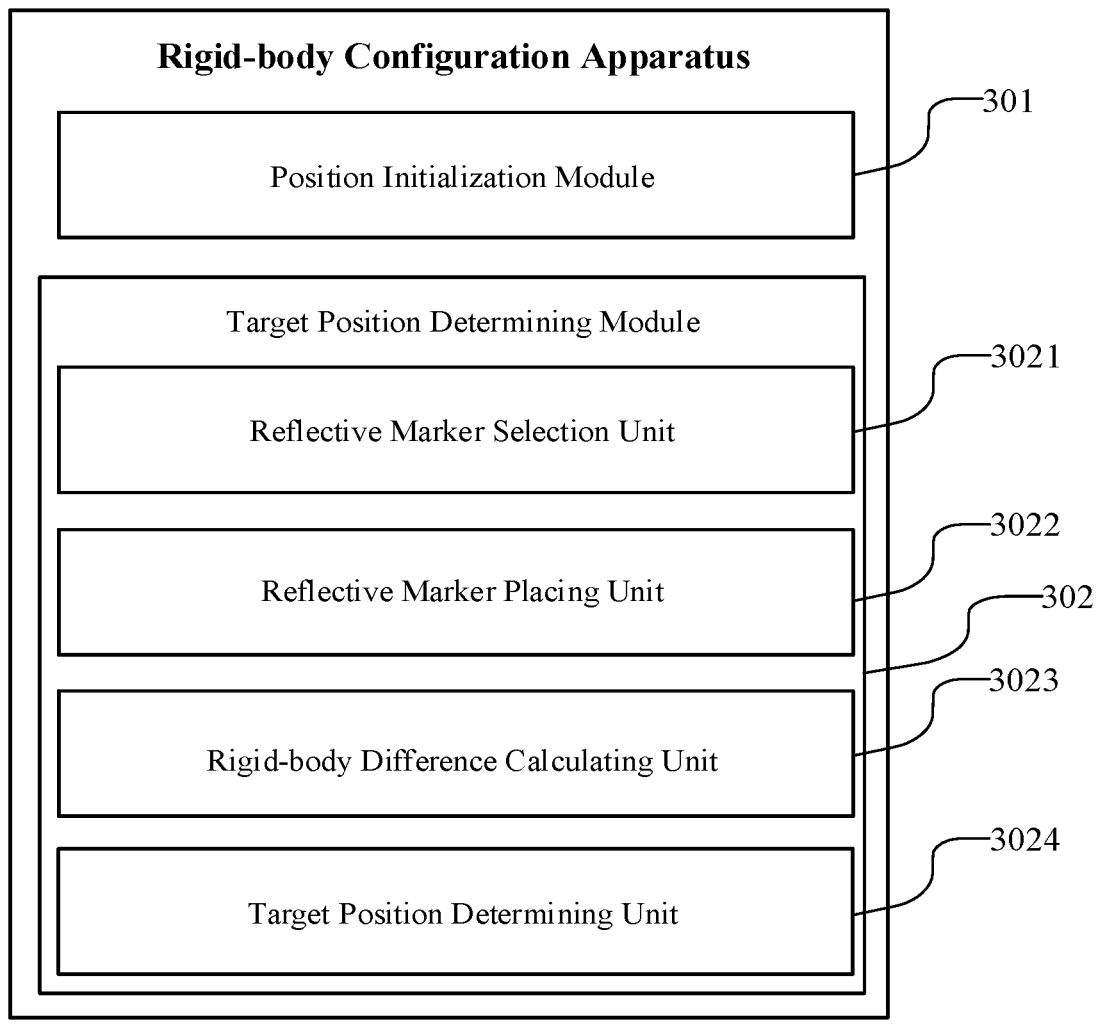
FIG. 3 illustrates a structural diagram of an example of a rigid-body configuration apparatus according to various embodiments of the present invention.

Referring to FIG. 3, an example of a rigid-body configuration apparatus according to various embodiments of the present invention may include:

a position initialization module 301, configured to initialize the positions of all reflective markers on each rigid body of more than two rigid bodies, and each rigid body including more than two reflective markers; and a target position determining module 302, configured to determine the target positions of the all reflective markers on each of the more than two rigid bodies, and to obtain the current rigid-body configuration result, where, the target position determining module 302 may include:

a reflective marker selection unit 3021, configured to select any reflective marker from the reflective markers with undetermined target positions as a target reflective marker, a reflective marker placing unit 3022, configured to fix other reflective markers except for the target reflective marker, and successively move the target reflective marker through each vacant position of the rigid body of the target reflective marker, a rigid-body difference calculating unit 3023, configured to respectively calculate, based on the position information of each reflective marker, the degree of rigid-body difference when the target reflective marker is at each vacant position, where the degree of rigid-body difference is a sum of the degree of differences between any two rigid bodies of the more than two rigid bodies, and a target position determining unit 3024, configured to determine the vacant position that corresponds to the maximum value of the degree of rigid-body difference as the target position of the target reflective marker.

The embodiments of the present invention further provides a terminal device, including a memory, a processor, and a computer program stored in the memory and operable on the processor. When the processor executes the computer program, the steps of any rigid-body configuration method as shown in FIG. 1 or FIG. 2 are implemented.

The embodiments of the present invention further provides a computer readable storage medium. The computer readable storage medium stores a computer program. When the computer program is executed by a processor, the steps of any rigid-body configuration method as shown in FIG. 1 or FIG. 2 are implemented.

Figure 4:
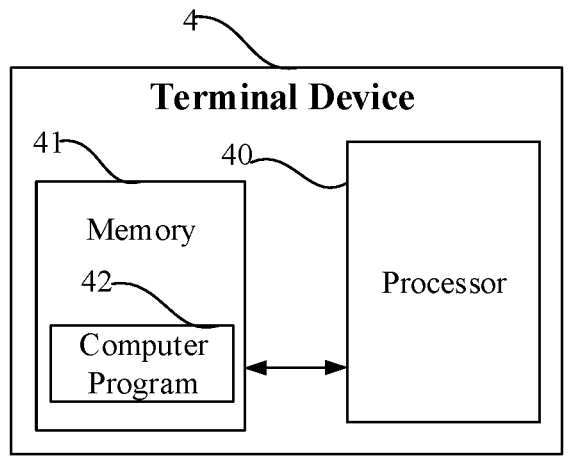
FIG. 4 illustrates a schematic diagram of a terminal device according to various embodiments of the present invention.

FIG. 4 is a schematic diagram of a terminal device according to an embodiment of the present invention. As shown in FIG. 4, the terminal device 4 of this embodiment includes a processor 40, a memory 41, and a computer program 42 stored in the memory 41 and operable on the processor 40. When the processor 40 executes the computer program 42, the steps in the embodiment of each rigid-body configuration method described above, such as steps 101 to 102 shown in FIG. 1, may be implemented. Alternatively, when the processor 40 executes the computer program 42, the functions of the modules/units in the embodiment of each apparatus described above, such as the functions of the modules 301 to 302 shown in FIG. 3, may be implemented.

The computer program 42 can be partitioned into one or more modules/units. The one or more modules/units may be stored in the memory 41 and may be executed by the processor 40 to complete the present invention. The one or more modules/units may be a series of computer program instruction segments capable of completing particular functions, and the instruction segments may be used to describe the execution of the computer program 42 in the terminal device 4.

The terminal device 4 may be a computing device such as various types of mobile phones, desktop computers, notebooks, pocket computers, and cloud servers. The terminal device may include, but is not limited to, a processor 40 and a memory 41. Those skilled in the art should understand that the terminal device 4 illustrated in FIG. 4 is only an example, and does not constitute any limitation to the terminal device 4. The terminal device 4 may include more or less components than those illustrated, or may combine some components, or may have different components. For example, the terminal device 4 may further include an input/output device, a network access device, a bus, etc.

The processor 40 may be a central processing unit (CPU), or may be other general-purpose processor, a digital signal processor (DSP), an application specific integrated circuit (ASIC), a field-programmable gate array (FPGA), or other programmable logic device, discrete gate or transistor logic device, discrete hardware components, etc. The general purpose processor may be a microprocessor, or the processor may be any conventional processor or the like.

The memory 41 may be an internal storage unit of the terminal device 4, such as a hard disk or a memory of the terminal device 4. The memory 41 may also be an external storage device of the terminal device 4, such as a plug-in hard disk equipped on the terminal device 4, a smart memory card (SMC), a secure digital (SD) card, a flash card, etc. Further, the memory 41 may include an internal storage unit of the terminal device 4 and also include an external storage device. The memory 41 may be used to store the computer program and other programs and data required by the terminal device. The memory 41 may also be used to temporarily store data that has been output or is about to be output.

Those skilled in the art should clearly understand that, for convenience and brevity of description, the illustration is only based on the division of the functional units and modules described above. In practical applications, according to needs, the above functions may be assigned to different functional units, modules to complete. That is, the internal structure of the device may be divided into different functional units or modules to complete all or part of the functions described above. The functional units and modules in the embodiment may be integrated into one processing unit, or each unit may exist physically separated, or more than two units may be integrated into one unit. The integrated unit described above may be implemented by hardware, or may be implemented in the form of a software functional unit. In addition, the specific names of the functional units and modules are only for the purpose of distinguishing between each other easily, and are not intended to limit the scope of protection of the present application.

Those of ordinary skill in the art should clearly understand that, for the convenience and brevity of the description, the specific working process of the system, the device and the unit described above can refer to the corresponding process in the method embodiment described above, and details are not described herein again.

In the above embodiments, the descriptions of the various embodiments are different, and the parts that are not detailed or described in the specific embodiments may be referred to the related descriptions of other embodiments.

Those of ordinary skill in the art should understand that units and algorithm steps of the various examples described in connection with the embodiments disclosed herein can be implemented in electronic hardware or a combination of computer software and electronic hardware. Whether these functions are implemented by hardware or software depends on the specific application and design constraints of the technical scheme. Those skilled in the art can use different methods for implementing the described functions for each particular application, but such implementation should not be considered to be beyond the scope of the present invention.

In the embodiments provided by the present invention, it should be understood that the disclosed apparatus and method may be implemented in other manners. For example, the system embodiment described above is merely illustrative. For example, the division of the modules or units is merely a division of the logical functions. In actual implementation, there may be another manner of division, for example, multiple units or components may be combined or may be integrated into another system, or some features may be ignored or may not be executed. In addition, the mutual coupling or direct coupling or communication connection shown or discussed may be an indirect coupling or communication connection through some interfaces, devices or units, and may be in electrical, mechanical or other form.

The units described as separate components may or may not be physically separated, and the components displayed as units may or may not be physical units, that is, may be located in one place, or may be distributed to multiple network units. Some or all of the units may be selected according to actual needs to achieve the purpose of the scheme of the embodiment.

In addition, each functional unit in each embodiment of the present invention may be integrated into one processing unit, or each unit may exist physically separated, or more than two units may be integrated into one unit. The integrated unit described above may be implemented by hardware, or may be implemented in the form of a software functional unit.

The integrated unit, when implemented in the form of a software functional unit and sold or used as a standalone product, may be stored in a computer readable storage medium. Based on such understanding, the present invention implementing all or part of the processes in the embodiments described above may also be completed by a computer program to instruct related hardware. The computer program may be stored in a computer readable storage medium. The steps of the various method embodiments described above may be implemented when the program is executed by the processor. The computer program may include computer program code, and the computer program code may be in a source-code form, an object-code form, an executable file, or some intermediate forms. The computer readable medium may include any entity or device capable of carrying the computer program code, a recording medium, a USB flash drive, a removable hard disk, a magnetic disk, an optical disk, a computer memory, a read-only memory (ROM), a random access memory (RAM, Random Access Memory), electrical carrier signals, telecommunications signals, software distribution media, etc. It should be noted that the content contained in the computer readable medium may be appropriately increased or decreased according to the requirements of legislation and patent practice in a jurisdiction. For example, in some jurisdictions, according to legislation and patent practice, the computer readable media may not include electrical carrier signals and telecommunication signals.

The embodiments described above are only for explaining the technical solutions of the present invention, and are not intended to limit the technical solutions; although the present invention has been described in detail with reference to the above embodiments, those of ordinary skill in the art shall understand that the technical solutions described in the examples can still be modified, or some of the technical features can be equivalently replaced; and such modifications or substitutions do not deviate from the spirit and scope of the technical solutions of the embodiments of the present invention, and should all be included in the scope of protection of the present invention.

What is claimed is:

1. A rigid-body configuration method, comprising:
initializing positions of all reflective markers on each rigid body of more than two rigid bodies, each rigid body containing more than two reflective markers and each reflective marker occupying one position on the rigid body;
determining target positions of the all reflective markers on each rigid body, and obtaining a current rigid-body configuration result, wherein a target position of any reflective marker on a rigid body is determined by following steps:

selecting any one reflective marker from reflective markers with undetermined target positions on the rigid body as a target reflective marker;

fixing other non-selected reflective markers at positions on the rigid body, wherein the rigid body further includes vacant positions, and successively moving the target reflective marker through each vacant position of the rigid body;

respectively calculating a degree of rigid-body difference when the target reflective marker is at each vacant position based on position information of each reflective marker, wherein the degree of rigid-body difference is a sum of a degree of differences between any two rigid bodies of the more than two rigid bodies; and determining a vacant position that corresponds to a maximum value of the degree of rigid-body difference as the target position of the target reflective marker;

after obtaining the current rigid-body configuration result, increasing a configuration number by one;

when the configuration number is less than a third threshold, saving the current rigid-body configuration result, and performing the step of initializing the positions of the all reflective markers on each rigid body of the more than two rigid bodies again to start a next rigid-body configuration; and when the configuration number is larger than or equal to the third threshold, determining, in a plurality of rigid-body configuration results, a configuration result that has a maximum value of the degree of rigid-body difference as a final rigid-body configuration result.

2. The rigid-body configuration method according to claim 1, wherein prior to respectively calculating the degree of rigid-body difference when the target reflective marker is at each vacant position based on the position information of each reflective marker, further including:

determining invalid positions of the target reflective marker on the rigid body based on the position information of each reflective marker, wherein the respectively calculating the degree of rigid-body difference when the target reflective marker is at each vacant position based on the position information of each reflective marker includes:

respectively calculating the degree of rigid-body difference when the target reflective marker is at each vacant position other than the invalid positions based on the position information of each reflective marker.

3. The rigid-body configuration method according to claim 2, wherein the determining the invalid positions of the target reflective marker on the rigid body based on the position information of each reflective marker includes:

determining whether all reflective markers on the rigid body are in a same plane based on the position information of each reflective marker on the rigid body of the target reflective marker; and when all reflective markers on the rigid body are in a same plane, determining a position at which the target reflective marker is currently located as an invalid position.

4. The rigid-body configuration method according to claim 2, wherein the determining the invalid positions of the target reflective marker on the rigid body based on the position information of each reflective marker includes:

respectively calculating distances between every two reflective markers of the rigid body based on the position information of each reflective marker on the rigid body of the target reflective marker; and when among the distances, a distance is smaller than a first threshold, determining a position at which the target reflective marker is currently located as an invalid position.

5. The rigid-body configuration method according to claim 2, wherein the determining the invalid positions of the target reflective marker on the rigid body based on the position information of each reflective marker includes:

calculating degrees of similarities between any two rigid bodies of the more than two rigid bodies based on the position information of each reflective marker on the rigid body of the target reflective marker; and when among the degrees of similarities, a degree of similarities meets a preset condition, determining a position at which the target reflective marker is currently located as an invalid position.

6. The rigid-body configuration method according to claim 5, wherein a first rigid body and a second rigid body are any two rigid bodies of the more than two rigid bodies that have a same number of reflective markers, and whether a degree of similarities between the first rigid body and the second rigid body meets the preset condition is determined by following steps:

based on position information of the reflective markers on the first rigid body, respectively calculating distances between every two reflective markers in the first rigid body to obtain a first distance set;

numbering a plurality of distance values in the first distance set in a first order, wherein the first order is an order in which distance values are from large to small, or an order in which distance values are from small to large;

based on position information of the reflective markers on the second rigid body, respectively calculating distances between every two reflective markers in the second rigid body to obtain a second distance set;

numbering a plurality of distance values in the second distance set in the first order;

respectively performing distance subtractions between distance values that are numbered same in the first distance set and the second distance set to obtain a plurality of distance differences; and when a number of distance differences, among the plurality of distance differences, falling within a preset range interval is greater than a second threshold, determining a degree of similarities between the first rigid body and the second rigid body as meeting the preset condition.

7. A terminal device, comprising:

a memory, a processor, and a computer program stored in the memory and operable on the processor, wherein when the processor executes the computer program, the rigid-body configuration method according to claim 1 is implemented.

8. A rigid-body configuration apparatus, comprising:

a position initialization module, configured to initialize positions of all reflective markers on each rigid body of more than two rigid bodies, each rigid body containing more than two reflective markers; and a target position determining module, configured to determine target positions of the all reflective markers on each of the more than two rigid bodies, and obtain a current rigid-body configuration result, wherein, the target position determining module includes:

a reflective marker selection unit, configured to select any reflective marker from reflective markers with undetermined target positions as a target reflective marker;

a reflective marker placing unit, configured to fix other reflective markers except for the target reflective marker, and successively move the target reflective marker through each vacant position of the rigid body of the target reflective marker;

a rigid-body difference calculating unit, configured to respectively calculate a degree of rigid-body difference when the target reflective marker is at each vacant position based on position information of each reflective marker, wherein the degree of rigid-body difference is a sum of a degree of differences between any two rigid bodies of the more than two rigid bodies; and a target position determining unit, configured to determine a vacant position that corresponds to a maximum value of the degree of rigid-body difference as a target position of the target reflective marker.

9. A non-transitory computer readable storage medium, wherein:

the computer readable storage medium stores a computer program for a rigid-body configuration method, wherein when the computer program is executed by a processor, the processor is configured to:

initialize positions of all reflective markers on each rigid body of more than two rigid bodies, each rigid body containing more than two reflective markers and each reflective marker occupying one position on the rigid body;

determine target positions of the all reflective markers on each rigid body, and obtain a current rigid-body configuration result, wherein a target position of any reflective marker on a rigid body is determined by:

selecting any one reflective marker from reflective markers with undetermined target positions on the rigid body as a target reflective marker;

fixing other non-selected reflective markers at positions on the rigid body, wherein the rigid body further includes vacant positions, and successively moving the target reflective marker through each vacant position of the rigid body;

respectively calculating a degree of rigid-body difference when the target reflective marker is at each vacant position based on position information of each reflective marker, wherein the degree of rigid-body difference is a sum of a degree of differences between any two rigid bodies of the more than two rigid bodies; and determining a vacant position that corresponds to a maximum value of the degree of rigid-body difference as the target position of the target reflective marker;

after the current rigid-body configuration result is obtained, increase a configuration number by one;

when the configuration number is less than a third threshold, save the current rigid-body configuration result, and perform the step of initializing the positions of the all reflective markers on each rigid body of the more than two rigid bodies again to start a next rigid-body configuration; and when the configuration number is larger than or equal to the third threshold, determine, in a plurality of rigid-body configuration results, a configuration result that has a maximum value of the degree of rigid-body difference as a final rigid-body configuration result.

10. The storage medium according to claim 9, wherein the processor is further configured to:

determine invalid positions of the target reflective marker on the rigid body based on the position information of each reflective marker, respectively calculate the degree of rigid-body difference when the target reflective marker is at each vacant position other than the invalid positions based on the position information of each reflective marker.

11. The storage medium according to claim 10, wherein the processor is further configured to:

determine whether all reflective markers on the rigid body are in a same plane based on the position information of each reflective marker on the rigid body of the target reflective marker; and when all reflective markers on the rigid body are in a same plane, determine a position at which the target reflective marker is currently located as an invalid position.

12. The storage medium according to claim 10, wherein the processor is further configured to:

respectively calculate distances between every two reflective markers of the rigid body based on the position information of each reflective marker on the rigid body of the target reflective marker; and when among the distances, a distance is smaller than a first threshold, determine a position at which the target reflective marker is currently located as an invalid position.

13. The storage medium according to claim 10, wherein the processor is further configured to:

calculate degrees of similarities between any two rigid bodies of the more than two rigid bodies based on the position information of each reflective marker on the rigid body of the target reflective marker; and when among the degrees of similarities, a degree of similarities meets a preset condition, determine a position at which the target reflective marker is currently located as an invalid position.

14. The storage medium according to claim 13, wherein a first rigid body and a second rigid body are any two rigid bodies of the more than two rigid bodies that have a same number of reflective markers, and whether a degree of similarities between the first rigid body and the second rigid body meets the preset condition is determined by the processor configured for:

based on position information of the reflective markers on the first rigid body, respectively calculating distances between every two reflective markers in the first rigid body to obtain a first distance set;

numbering a plurality of distance values in the first distance set in a first order, wherein the first order is an order in which distance values are from large to small, or an order in which distance values are from small to large;

based on position information of the reflective markers on the second rigid body, respectively calculating distances between every two reflective markers in the second rigid body to obtain a second distance set;

numbering a plurality of distance values in the second distance set in the first order;

respectively performing distance subtractions between distance values that are numbered same in the first distance set and the second distance set to obtain a plurality of distance differences; and when a number of distance differences, among the plurality of distance differences, falling within a preset range interval is greater than a second threshold, determining a degree of similarities between the first rigid body and the second rigid body as meeting the preset condition.

* * * * *